United States Patent Office 3,086,969
Patented Apr. 23, 1963

3,086,969
PROCESS FOR PERIODATE OXIDATION OF POLYSACCHARIDES
James E. Slager, Zeeland, Mich., assignor to Miles Laboratories, Inc., Elkhart, Ind., a corporation of Indiana
No Drawing. Filed June 27, 1960, Ser. No. 38,735
6 Claims. (Cl. 260—209)

This invention relates to a process for the preparation of dialdehyde polysaccharides. In one of its more particular aspects this invention relates to an improved process for the oxidation of polysaccharides to dialdehyde polysaccharides wherein the oxidation is carried out by periodic acid.

The selective oxidation of 1,2-glycols by periodate ions has been known in the art for many years. The technique of this selective oxidation was first applied to polysaccharide materials by Jackson and Hudson who reported their work in the Journal of the American Chemical Society, vol. 59, at page 2049, in 1937. The reaction involved proceeds in accordance with the following equation:

Equation 1:

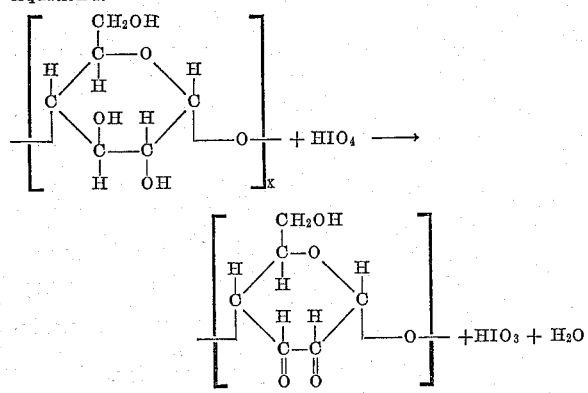

wherein X represents the number of repeating polymer units in the molecule of dialdehyde polysaccharide material which in the case of starch, for example, may vary from as few as twenty to as many as several thousand. Since this work was completed, significant advances have been made in the electrolytic preparation of dialdehyde polysaccharides exemplified by U.S. Patent No. 2,648,-629 to William Dvonch and Charles L. Mehltretter, No. 2,713,553, No. 2,770,589 and No. 2,830,941 to Charles L. Mehltretter.

The prior art processes, although providing the desired dialdehyde polysaccharides, are subject to the disadvantage that the yields of dialdehyde polysaccharides so prepared and the quality of such dialdehyde polysaccharides are relatively low, especially for commercial application. In particular, separation of the products of these processes results in contamination of the products with various undesirable by-products which makes the over all process less commercially desirable.

It is accordingly an object of this invention to provide a process which is capable of producing dialdehyde polysaccharides of a higher purity and in increased yield.

Another object of this invention is to provide such an improved process which is readily adaptable to inclusion in the usual processes of dialdehyde polysaccharide production.

Another object of this invention is to provide a process for the preparation of dialdehyde polysaccharides which is easy to use and commercially practicable.

Yet another object of this invention is to provide a process for the conversion of polysaccharides to dialdehyde polysaccharides which are relatively uncontaminated with undesirable by-products or with materials introduced in the course of converting the polysaccharides to dialdehyde polysaccharides.

Other objectives and advantages of this invention will become apparent in the course of the following detailed disclosure and description.

It has now been found that improved yields of periodate oxidized polysaccharides of a high purity may be obtained by adjusting the hydrogen ion concentration of the periodic acid solution used as the oxidizing agent to a point below about pH 1.0 prior to contacting the polysaccharide material to be oxidized with such periodic acid solution. Although it is possible to prepare dialdehyde polysaccharides by periodic acid oxidation using a periodic acid solution having a hydrogen ion concentration of above about pH 1.0 this practice is undesirable for a number of reasons. First, at a hydrogen ion concentration of above about pH 1.0, in order to obtain a product which is not highly contaminated with iodate ions, it is necessary to use a concentration of periodic acid solution which is below about 10% of the weight of the total reactants. This, of course, results in relatively poorer yields of dialdehyde polysaccharide per unit volume of reactants.

A second disadvantage of the use of periodic acid solutions having a hydrogen ion concentration of above about pH 1.0 is that a somewhat inferior product results from the use of correspondingly lesser concentrated reactant solutions.

Still a third disadvantage is the necessity for using a complex and difficult washing procedure to obtain materials of a useful purity. The concomitant loss of iodate ion and dialdehyde polysaccharide product by virtue of such washing results in making such process relatively uneconomical to operate.

However, when the hydrogen ion concentration of the periodic acid oxidizing solution is adjusted to below about pH 1.0 greater concentrations of reactants may be used and surprisingly economical yields obtained.

A wide variety of dialdehyde polysaccharides may be advantageously prepared according to the process of this invention. For example, starches such as corn starch, wheat starch, tapioca starch and potato starch, celluloses, dextrins, dextrans, inulin and related materials may be used.

The periodic acid solution for the oxidation reaction may be conveniently prepared by the process described in U.S. Patent No. 2,830,941 to Charles L. Mehltretter. This electrolytic process involves the conversion of iodine to iodate ion in the presence of an alkali and the further conversion of iodate ion to periodate ion in an acid medium. The anolyte from the electrolytic reaction is normally filtered to remove lead dioxide particles and used directly to oxidize polysaccharide materials. It has been found that the periodic acid solution from this process may have a hydrogen ion concentration of from about pH 0.5 to pH 1.6 depending upon the concentration of the solution. In tabular form below are given the pH values of various concentrations of periodic acid.

TABLE 1 pH of Periodic Acid Solutions

| Concentration, percent: | pH |
|---|---|
| 1.25 | 1.6 |
| 2.50 | 1.3 |
| 5.00 | 1.1 |
| 10.00 | 0.8 |
| 20.00 | 0.7 |

The adjustment of the hydrogen ion concentration of the periodic acid solution for use in the process of this invention may be conveniently accomplished by adding to the periodic acid solution any strong acid which is not oxidized or reduced under the reaction conditions used in the process of this invention. For example, sulfuric acid, phosphoric acid or formic acid may be used for this purpose. Other acids may also be used if desired, but halogen acids are not desirable for this purpose because they are oxidized under the conditions of this process. On the other hand, nitric acid and other oxidizing acids are not desired for use because they in turn would oxidize some of the dialdehyde polysaccharide producing unwanted by-products. The amounts of acid required for pH adjustment is, of course, dependent upon the concentration of periodic acid in the solution and the particular pH level desired.

The temperature of the reaction should be maintained within a range which is effective to promote the periodate oxidation of the polysaccharides yet on the other hand not high enough to cause hydrolysis of the polysaccharides to produce a difficultly handled gelatinous material. In general, temperatures in the range of from about 30° C. to 35° C. have been found most efficient. However, temperatures on either side of this range may be used, depending upon the concentration of the reactants.

The time of reaction will of course depend upon the molar ratio of the reactants and the desired degree of conversion of the polysaccharide material to the dialdehyde polysaccharide. Products having a conversion of as high as about 98%, that is, those in which about 98% of the repeating polymer units of the polysaccharide have been converted to the dialdehyde may be obtained according to the process of this invention. In general, products having any desired percent of conversion to the dialdehyde may be obtained by selecting the proper molar ratio of the reactant and the time for conducting the reaction. Ordinarily the reaction is allowed to proceed until the desired quantity of periodate ions has been removed from the reaction mixture, that is, converted to iodate ions. The time of reaction as above described will depend upon the product desired and the reactant concentrations but will in general vary between about 3 and 5 hours.

The invention will be better understood by reference to the following examples which are included for purposes of illustration and are not to be construed as in any way limiting the scope of this invention.

EXAMPLE I

Into a 50 gallon glass-lined jacketed reactor equipped with means for efficient agitation there was placed 407 lbs. of an aqueous solution containing 52.8 lbs. of periodic acid. This represented a concentration of 13.0% by weight of periodic acid. The pH of this solution was 0.7. Agitation was commenced and to the agitating solution there was added 61.5 lbs. of pearl corn starch (defatted) containing 10% moisture or 55.3 lbs. of starch on a dry basis. This represented a charge of 15 wt. percent starch. The rate of addition was adjusted so that the temperature of the exothermic reaction ensuing was maintained by circulating cooling water through the reactor jacket, within the range of from 30° C. to 32° C.

After the addition of the starch, the reaction was allowed to proceed to the point of completion. This point was determined by taking aliquot samples of the reaction mixture and testing for periodic acid. When the amount of the periodic acid in the aliquot (and the reaction vessel) had reached a concentration of 1.75% by weight the reaction was considered to be complete. This point was reached in approximately 4 hours.

The oxidized starch was then separated from the reactants by filtration, washed with a volume of water such that the total filtrate was equal to the volume of the initial reactant. Analysis of this filtrate indicated an iodate recovery of 98.0%.

The oxidized starch was again further washed with water and dried in an oven to less than 10% moisture content. There was obtained 60 lbs. of dialdehyde starch, 8% moisture, which represents a yield of 99.5% of theory. The residual iodate in this product was 0.8%. The product was a white powder of excellent free-flowing characteristics and gave a stability test rating of AA.

This stability test, which was developed by the staff of the Northern Regional Laboratories of the United States Department of Agriculture, is commonly used in the art and is conducted as follows:

The alkali solubilization test is carried out in two stages. First, add 0.1 N NaOH solution to a sample of the dialdehyde starch in a small beaker in the weight ratio of 1.5 to 1. This is 1.5–1.25 ml. solution per gram dialdehyde starch, depending on the moisture content of the latter. Mix thoroughly at room temperature with stirring rod for 3–4 minutes. Second, when there is no further change on mixing, warm on a steam bath to about 60° C. and continue mixing. Report the results of both stages of the test with letters representing observed behavior as follows:

First stage (mixing dialdehyde starch and 0.1 N NaOH):

A—Solid takes up liquid completely in a few seconds to form a moist, crumby mixture.

B—Solid takes up liquid but requires a minute or more mixing.

C—Creamy mixture forms; crumby solid condition is not attained.

D—Slurry remains unchanged for 3–4 minutes of mixing; may thicken slightly on warming.

Second stage (warming to about 60° C. on steam bath):

A—Crumbs glaze rapidly with warming and pass quickly through pasty condition to a clear yellow solution. If a slurry at the start, may quickly lose opacity to become clear yellow solution.

B—Longer heating necessary to dissolve or solution may contain some undissolved material (not to be confused with foam or gas bubbles).

C—Product of heating has two layers—one clear solution and the other undissolved material.

D—No perceptible change except darker color.

Thus "AA" represents the behavior of freshly prepared 100% dialdehyde starch, "DD" the behavior of badly aged material and others intermediate.

This example shows that a product of exceptionally high purity is obtained in an excellent yield where the teachings of this invention are followed, that is, where the hydrogen ion concentration of the periodic acid solution is adjusted to below about pH 1. In this case by using a periodic acid solution of pH 0.7 in a concentration of 13.0% and a charge of 15% polysaccharide, an almost quantitative conversion was realized.

The following example illustrates that an unacceptable product is obtained when the hydrogen ion concentration of the periodic acid solution is of a level of above pH 1.0 and the reactant concentrations are of the same order of magnitude as in Example I.

EXAMPLE II

Into the reaction vessel described in Example I, there was placed 352 lbs. of an aqueous solution containing 43.5 lbs. of periodic acid. This represented a weight percent of 12.4%. This solution had a pH of 1.5. There was added to the reactor vessel 50.5 lbs. of pearl corn starch (defatted) containing 10% moisture or 45.5 lbs. of starch on a dry basis. This amount of starch represents a weight percent concentration of 12.8%.

The reaction was maintained at a temperature of from 35° C. to 37° C. and reaction was completed after about 6½ hours.

The reaction mixture was filtered to remove the product, which was washed with a volume of water such that the filtrate obtained was equal in volume to the volume of the initial reaction. Tests of the filtrate indicated an iodate ion concentration of 59%.

The product was further washed with water and dried in an oven to less than 10% moisture. There was obtained 48 lbs. of a highly colored product containing 5.0% moisture which was granular in appearance and turned purple upon standing. Tests indicated that there was 3.6% residual iodate ion in the product. It was considered to be unacceptable and was not submitted to the stability test.

This example shows that when the hydrogen ion concentration of the oxidized solution of periodic acid is not adjusted to below about pH 1.0 an unacceptable product is obtained. As shown in Example I, adjustment of the hydrogen ion concentration of the periodic acid to a pH below about 1.0 results in excellent yields of acceptable product using concentrations of reactants in about the same concentration as in this example.

The following example illustrates that an acceptable product may be obtained without pH adjustment by the prior art process if low concentrations of reactants are used.

EXAMPLE III

Following the procedure described in Example I above, 322 lbs. of an aqueous solution containing 22.3 lbs. of periodic acid, representing a concentration of 7.0% by weight, was charged to the reaction vessel. The pH of this solution was pH 1.5. There was then charged to the reaction vessel, with stirring, 19.0 lbs. of pearl corn starch (defatted) of 10% moisture content. This represented 17 lbs. on a dry basis and a reactant composition of 5% by weight.

The reaction was maintained at a temperature of from 35° C. to 37° C. for 7 hours after which time the reaction was determined to be complete on the basis of concentration of iodate then present.

The product was filtered from the reaction mixture and washed with a volume of water such that the resulting filtrate, containing iodate ions, was equal in volume to the initial reactants. The iodate recovery was 97.5%.

The dialdehyde starch was again washed with water and dried in an oven to less than 10% moisture. The product obtained, 18.0 lbs., 4.1% moisture (100.5% of theory), was a white free-flowing powder with a residual iodate content of 0.4% and gave a stability test rating of AA.

It will be seen from this example that an acceptable product may be obtained by the prior art process. However, the amount of product obtained per unit volume of reactant is extremely low. When the concentration of the reactant per unit volume is increased an unacceptable material is obtained, for example, as shown in Example II above.

The following example illustrates the preparation of dialdehyde polysaccharides using appreciably higher concentrations of reactants at below about pH 1.0.

EXAMPLE IV

One hundred forty-five pounds of an aqueous solution containing 32.8 lbs. of periodic acid (28.0 weight percent) having a pH of 0.6 was placed in the reaction vessel described in Example I above. There was added with stirring 25.5 lbs. of pearl corn starch (defatted) of 10% moisture content (22.0 lbs.—dry basis), representing a concentration of 23.0 weight percent.

After about 3.5 hours at a temperature of between 30° C. and 32° C. the reaction was complete.

The product was recovered in accordance with the procedures described in Example I above, the filtrate indicating an iodate recovery of 100%.

The finished product, 25.0 lbs., 5.2% moisture, representing a yield of 102% of theory, had a residual iodate content of 0% and gave a stability test rating of AA.

This example shows that by adjustment of the hydrogen ion concentration of the oxidizing solutions of periodic acid to below about pH 1.0 the concentration of this reactant may be increased so that an economical over-all yield of product is obtained.

As is pointed out above, the improved process of this invention results in improved yields of a desirable product and enables a process operator to obtain greater quantities of product per unit volume of reactants. If concentrations of reactants above about 10% are utilized without adjustment of the pH of the periodate solution to below about pH 1.0, undesirable products are obtained.

For convenience in comparaision of the data given above, it is set out in tabular form below.

TABLE 2

| Ex. No. | Wt. Percent HIO$_4$ | Wt. Percent Starch | pH HIO$_4$ Solution | Reaction Temp. (° C.) | Reaction Time (hours) | Residual IO$_3$ in Product (Percent) | Percent Yield | Stability Test |
|---|---|---|---|---|---|---|---|---|
| I | 13.0 | 15.0 | 0.7 | 30–32 | 4 | 0.04 | 99.5 | AA |
| II | 12.4 | 12.8 | 1.5 | 35–37 | 6.5 | 3.6 | 100 | |
| III | 7.0 | 5.0 | 1.5 | 35–37 | 7 | 0.02 | 100.5 | AA |
| IV | 28.0 | 23.0 | 0.6 | 30–32 | 3.5 | 0.0 | 102 | AA |

To reiterate briefly, the present invention is directed to an improved process for the preparation of dialdehyde polysaccharides by periodic acid oxidation of polysaccharide materials. Specifically, the invention resides in the improvement which comprises maintaining the hydrogen ion concentration of periodic acid at below about pH 1.0. Improved yields of a product having desirable properties are thereby obtained.

What is claimed is:

1. A process for the periodic acid oxidation of polysaccharides comprising reacting a polysaccharide with a solution of periodic acid having a concentration of at least 10% by weight of the total reactants and a sufficient quantity of a strong acid which is not oxidized and not reduced by said polysaccharide to maintain the hydrogen ion concentration of said periodic acid solution at below about pH 1.0 for a time sufficient to produce a periodate oxidized polysaccharide and thereafter recovering the periodate oxidized polysaccharide thereby obtained.

2. A process according to claim 1 wherein the strong acid is selected from the group consisting of sulfuric acid, phosphoric acid, and formic acid.

3. A process according to claim 1 wherein said polysaccharide is starch.

4. A process for the periodic acid oxidation of a polysaccharide comprising reacting said polysaccharide with a periodic acid solution having a concentration of at least about 10% by weight of the total reactants having a hydrogen ion concentration of below about pH 1.0 at a temperature of from about 30° C. to 35° C. for from about 3 hours to 5 hours in order to convert said polysaccharide to the corresponding dialdehyde polysaccharide and recovering the dialdehyde polysaccharide thereby produced.

5. A process according to claim 4 wherein said polysaccharide is starch and said dialdehyde polysaccharide is dialdehyde starch.

6. A process for the periodic acid oxidation of a polysaccharide comprising reacting said polysaccharide with a periodic acid solution having a concentration of at least about 10% by weight of the total reactants and a hydrogen ion concentration of below about pH 1.0 for a time sufficient to produce a periodic oxidized polysaccharide.

References Cited in the file of this patent

UNITED STATES PATENTS 2,537,978    Eberl ------------------- Jan. 16, 1951
2,606,188    Yelland ---------------- Aug. 5, 1952

OTHER REFERENCES

Radley: "Mfg. Chemist and Mfg. Perfumer," July 1942, XIII, 7, pp. 158 to 161 and 166.

Mehltretter et al.: "Industrial and Engineering Chemistry," vol. 49, No. 3, March 1957, pp. 350–354.